United States Patent [19]

Jacob

[11] 4,387,531
[45] Jun. 14, 1983

[54] FRICTION TYPE GAME CALL

[76] Inventor: Bart M. Jacob, Box 184, East Rupert, Vt. 05768

[21] Appl. No.: 309,199

[22] Filed: Oct. 5, 1981

[51] Int. Cl.³ ............................................. A63H 5/00
[52] U.S. Cl. .................................................. 46/189
[58] Field of Search ................. 46/189, 191, 192, 174; 84/402, 410

[56] References Cited

U.S. PATENT DOCUMENTS

| | | | |
|---|---|---|---|
| 1,257,448 | 2/1918 | Belton | 46/189 |
| 2,609,640 | 9/1952 | Newell et al. | 46/175 R |
| 2,643,483 | 6/1953 | Walker | 46/189 |
| 3,208,184 | 9/1965 | Wisor | 46/189 |
| 3,367,064 | 2/1968 | Anthony et al. | 46/189 |
| 3,419,996 | 1/1969 | Johnson, Jr. | 46/189 |

*Primary Examiner*—Mickey Yu
*Attorney, Agent, or Firm*—Lahive & Cockfield

[57] ABSTRACT

A friction game call includes a cylindrical wall with an open, diagonally truncated end to be held against the body, and another end closed by a slate loosely held in an oversized slot in the cylindrical wall so that the slate may vibrate in response to a striker grasped by a hand also holding the game call. The cylindrical wall extends past the held slate.

6 Claims, 4 Drawing Figures

FRICTION TYPE GAME CALL

This invention relates to a hand operated game call and more particularly to the improvement of the friction type game call commonly called the "peg & slate" used on the wild turkey.

There are several types of game calls. Some are mouth operated relying on the user blowing or sucking on an instrument capable of making a sound. These calls require the use of one hand to hold the call and some held within the mouth do not require the hands at all leaving either or both available to hold gun, bow or camera. But all mouth calls require considerable practice to utilize properly. Other types of calls are hand operated producing sound from the friction of one material against another and often utilizing various sound boxes to further magnify or modify these sounds. Friction type calls take many forms and are made from various materials. They most often require two hands to operate. However, there are some exceptions where through the use of rubber bands or springs only one hand is needed but because the movement is preset the variety of sounds that can be produced is limited.

Two of the best known and oldest types of friction calls are the so-called "box call" and the "peg & slate." The box call produces sound by striking a chalk covered wooden "lid" against the side of the box. The box is held in one hand and the lid manipulated by the other. The peg & slate call produces sound by striking a piece of slate, which may be held alone in one hand or is mounted in a wooden frame which is held in the hand, with a wooden or plastic peg. This produces sound much as rubbing a piece of chalk or wood over a classroom blackboard. This peg must be manipulated with the other hand. The peg & slate call is capable, however, of making some turkey sounds like the "cluck" and "purr" more realistically than with any other device. The shortcomings are, first—that it requires two hands to use, and secondly—it is not capable of making many other turkey sounds as well or as easily as with some of the other devices.

It is, therefore, a primary object of this invention to provide a peg & slate call that can be operated with only one hand leaving the other free to hold gun, bow or camera, in a ready or operating position and a peg & slate call capable of making most turkey sounds as realistically as possible and, therefore, capable of greater variations of sound.

Broadly speaking, the invention provides a friction type game call where the striking surface is contained in one end of an open ended truncated cylinder. The open end of such when held against the user's body forms a complete sound box. This cylinder having holes in its walls to allow the sound to escape and having its wall entend beyond the striking surface to provide a purchase place for hand operating the striker. The truncated cylinder also provides a freely vibrating striking surface, a varying sound chamber and a striking surface of such area as to make use of the sound variations provided by each without confining the stroke made by the striker.

More specifically, a friction type game call where thin slate, or other material used as a striking surface, is contained in one end of an open ended leather, wood or plastic truncated cylinder. The open end of such when held against the user's body forms a complete sound box. This cylinder having holes in its side wall of proper dimension so as to allow sound to escape and such cylinder having its wall extend beyond the striking surface so that the butt of the user's hand may be rested there while using the striker in order to hold the call steady in place for one handed operation. This cylinder contains the striking surface in an oversized slot but does not hold it tight, so that it may vibrate freely when stroked. There being a difference of sound thus produced by stroking the center of the surface or the more free to vibrate edge of the surface. (This requires a relatively thin piece of slate approximately 3/32".) The cylinder also being truncated so as to have a variation of wall length from a short side to a long so that at one point the sound box formed against the user's body is shallow and at the opposite point is deep changing the effect of the sounds made by stroking the striking surface at these points. These sounds are further effected as to whether they are made on the striking surface near the sound escape holes in the cylinder wall or far from the holes deep in the sound chamber. The striking surface thus being contained in this cylinder must be large enough in diameter (at least $3\frac{1}{2}$") to provide sufficient area so that sound variations from striker movement on the various portions of the striking surface may be fully utilized without confining the stroke made by the striker.

Therefore, when such a device hangs from the user's neck against his chest or rests on his leg or knee, it can be held in place there with the butt of the palm of the user's hand resting on the extension of the cylinder wall above the striking surface. The same hand then is in position of complete control in the use of a peg or striker for strokes of various kinds on the striking surface without the need of the second hand. Also the various portions of the striking surface offer the control of sound made by the strokes of the striker to include changes in pitch, tone and coarseness. No claims are being made here as to the construction of the peg or striker. Any now in existence and those to be produced to take advantage of this invention will prove effective when used with the invention.

The invention is more fully described in connection with the accompanying drawings in which.

Figure 1:
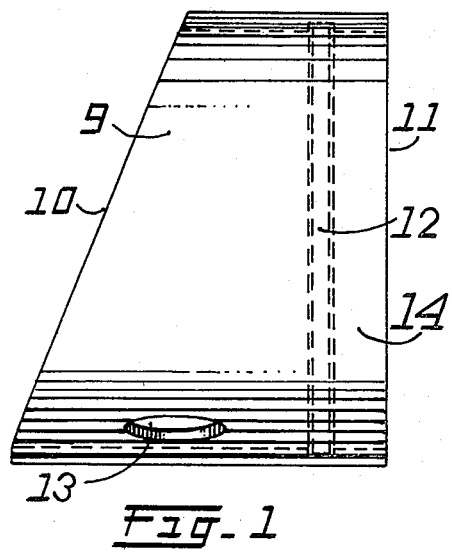
FIG. 1 is an elevation view of the invention.

With reference now to the drawings, FIG. 1 shows a truncated cylinder (9) with an open end (10) and a closed end (11). This end is closed with a piece of thin slate or some other striking surface (12). This striking surface is recessed within said end of the truncated cylinder so that the extension of the cylinder wall (14) provides a resting place for the hand manipulating the striker. This hand, when holding the truncated cylinder against the body, causes the open end to be closed by a portion of the body and a sound box to be formed. Sound may then escape from said sound box by the holes (13) provided.

Figure 2:
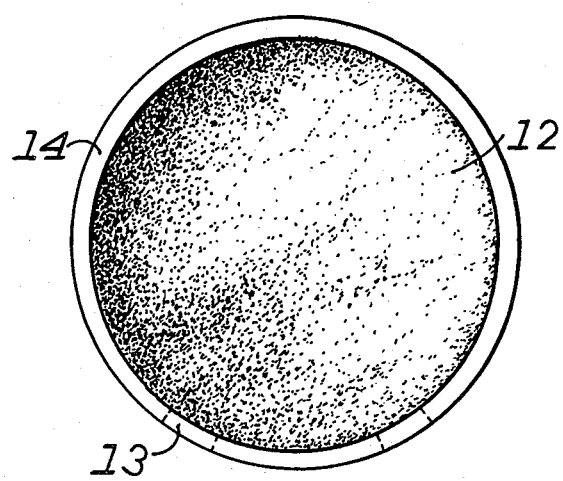
FIG. 2 is a plan view of the invention.

FIG. 2 shows the striking surface (12) contained within the cylinder, the wall extension (14), and the placement of the sound escape holes (13). Looking at FIGS. 1 and 2, one may see that to strike the striking surface at its top would take place over the shallow end of the sound box. Striking in the center would be over a deeper portion of the sound box and striking on the bottom would be near the sound escape holes.

Figure 3:
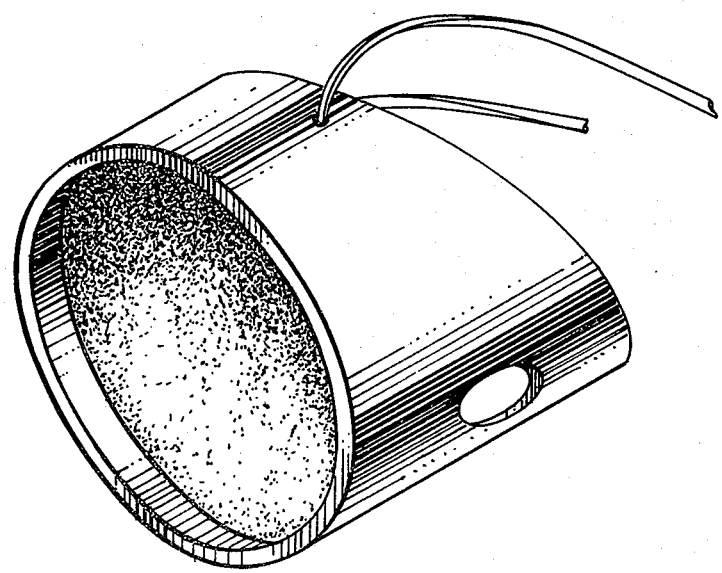
FIG. 3 is a perspective view of the invention.

FIG. 3 shows the complete invention, a lanyard attached near the top so that it may hang from the user's neck against his chest.

Figure 4:
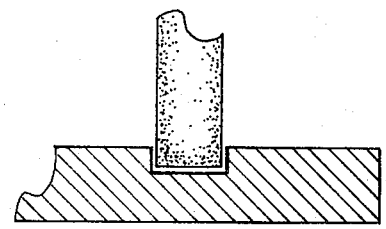
FIG. 4 is an enlarged cross-sectional view showing a portion of the wall of the truncated cylinder containing the striking surface of the invention.

FIG. 4 shows the enlarged slot in the wall of the truncated cylinder containing the striking surface, but not holding it tight so that it may vibrate freely.

The drawings do not show the striker or peg as many designs now in existance may be used with this invention and no claims are made here on this account.

Thus from these drawings it can be seen that the invention will provide a friction type (peg and slate) game call where the striking surface is contained in one end of an open ended truncated cylinder, the open end of which when held against the user's body forms a complete sound box. The holes in the wall of said cylinder allowing sound to escape from said sound box. The extension of the cylinder wall above the striking surface allows the user to both steady the device and also operate the device with one hand. The peg or striker being used with short strokes against the striking surface made with the fingers while the butt of the palm of the hand holds the call in place hanging against the chest or sitting on the leg or knee of the user. A hunter or photographer using this device may then use his other hand to ready his gun or bow or operate his camera. It can further be seen that the device provides a freely vibrating striking surface which enables the user to get variation in sound from striking this surface near its center or near its edge. A thin freely vibrating surface produces a livelier sound than one held in the hand or solid material no matter where it is stroked. It also produces such sounds as soft clear hollow sounding "tree yelps" of the hen turkey when stroked in the center and high pitched rasy yelps when stroked at the edge.

It can further be seen that the device provides a varying sound chamber which allows the user to get further variety of sound when striking the surface. Short skips of the peg producing the "cluck" of the turkey for instance, when made over the shallow part of the chamber are of relatively high pitch, when made over the center or deeper part of the chamber are of lower pitch, and when made next to the sound escape holes are of flatter tone.

It can further be seen that the device provides a striking surface of sufficient area so that all strokes made by the peg or striker can be made utilizing a given part of the surface as described above.

Therefore, I claim:

1. A friction type game call comprising:
a cylindrical wall, having an open, diagonally truncated first end, and a second end,
said cylindrical wall being adapted to be held against the body by a single hand also grasping a striker,
a wall means for closing said second end,
said wall means having an exterior striking surface,
said cylindrical wall having holding means for holding said wall means, and
said cylindrical wall defining at least one hole for the release of sound from said game call.

2. The friction type game call of claim 1 in which said second end of said cylindrical wall extends beyond said exterior striking surface.

3. The friction type game call of claim 1 in which said cylindrical wall holding means is adapted to hold said wall means loosely so that said wall means may vibrate in response to said exterior striking surface being struck by said striker.

4. The friction type game call of claim 3 in which said cylindrical wall holding means comprises an oversized slot.

5. The friction type game call of claim 1 in which said wall means comprises a slate.

6. A friction type game call comprising:
a cylindrical wall, having:
an open, diagonally truncated first end, and a second end,
said cylindrical wall being adapted to be held against the body by a single hand also grasping a striker, a slate comprising a plate having an exterior striking surface,
said slate being held by said cylindrical wall to close said second end,
said cylindrical wall defining an interior slot adjacent said second end,
said slot holding said slate and being sized to hold said slate loosely so said slate may vibrate in response to being struck by said striker,
said cylindrical wall further defining at least one hole for the release of sound from said game call.

* * * * *